US006559228B2

(12) United States Patent
Kim et al.

(10) Patent No.: US 6,559,228 B2
(45) Date of Patent: May 6, 2003

(54) VINYL 4-T-BUTOXYCARBONYLOXYBENZAL-VINYL 4-HYDROXYBENZAL-VINYL ALCOHOL-VINYL ACETATE COPOLYMER

(75) Inventors: Jin Baek Kim, Seoul (KR); Hyun Woo Kim, Seoul (KR)

(73) Assignees: Hyundai Electronics Industries Co. Ltd., Kyoungki-do (KR); Korea Advanced Institute of Science and Technology ("KAIST"), Taejon (KR)

( * ) Notice: Subject to any disclaimer, the term of this patent is extended or adjusted under 35 U.S.C. 154(b) by 0 days.

(21) Appl. No.: 09/813,307

(22) Filed: Mar. 21, 2001

(65) Prior Publication Data

US 2001/0020065 A1 Sep. 6, 2001

Related U.S. Application Data

(62) Division of application No. 08/757,262, filed on Nov. 27, 1996, now Pat. No. 6,235,836.

(30) Foreign Application Priority Data

Nov. 28, 1995 (KR) .............................. 95-44162

(51) Int. Cl.[7] .............................. C08F 116/06
(52) U.S. Cl. .................. 525/60; 430/286.1; 525/59; 525/61
(58) Field of Search ................. 525/60, 59, 61; 430/286.1

(56) References Cited

U.S. PATENT DOCUMENTS

| 3,793,033 A | | 2/1974 | Mukherjee ............... 96/115 |
|---|---|---|---|
| 4,115,128 A | | 9/1978 | Kita |
| 4,374,193 A | * | 2/1983 | Moriya et al. .............. 430/149 |
| 4,491,628 A | | 1/1985 | Ito et al. |
| 5,691,101 A | * | 11/1997 | Ushiroguchi et al. ....... 430/176 |

FOREIGN PATENT DOCUMENTS

| GB | 1159985 | 7/1969 |
|---|---|---|
| GB | 1325617 | 8/1973 |
| GB | 2307686 | 11/1996 |
| JP | 56161537 | 5/1980 |
| JP | 01059832 A | 3/1989 |
| JP | 04048715 A | 2/1992 |
| JP | 2749031 | 11/1996 |
| SU | 833-990 | 7/1979 |

OTHER PUBLICATIONS

German Patent Office Official Action (with translation).
Taiwan Preliminary Re–examination Report (with translation).

* cited by examiner

*Primary Examiner*—Judy M. Reddick
(74) *Attorney, Agent, or Firm*—Nath & Associates PLLC; Gary M. Nath; Lee C. Heiman

(57) ABSTRACT

There is a vinyl 4-hydroxybenzal-vinylalcohol-vinyl acetate copolymer, a 4-t-butoxycarbonyloxybenzal-vinyl alcohol-vinyl acetate copolymer and a vinyl 4-t-butoxycarbonyloxybenzal-vinyl 4-hydroxybenzal-vinyl alcohol-vinyl acetate copolymer suitable for photoresist and methods for preparing the same. The latter two polymers contain 4-hydroxybenzal groups all or parts of which are protected with t-butoxycarbonyl group. Superior in transparency, thermal stability, mechanical strength, and adhesiveness to silicon wafer, the photoresists prepared from the protected copolymers can enhance the resolution of fine circuit by virtue of low weight loss upon the thermal treatment after exposure.

4 Claims, No Drawings

VINYL 4-T-BUTOXYCARBONYLOXYBENZAL-VINYL 4-HYDROXYBENZAL-VINYL ALCOHOL-VINYL ACETATE COPOLYMER

This application is a divisional application of U.S. patent application Ser. No. 08/757,262, filed Nov. 27, 1996, now U.S. Pat. No. 6,235,836 the entire contents which is hereby incorporated by reference in its entirety.

BACKGROUND OF THE INVENTION

1. Field of the Invention

The present invention relates to a copolymer suitable for photoresist. More particularly, the present invention relates to a vinyl 4-hydroxybenzal-vinyl alcohol-vinyl acetate copolymer, a vinyl 4-t-butoxycarbonyloxybenzal-vinyl alcohol-vinyl acetate copolymer and a vinyl 4-t-butoxycarbonyloxybenzal-vinyl 4-hydroxybenzal-vinyl alcohol-vinyl acetate copolymer. In the last two copolymers, all or part of the vinyl 4-hydroxybenzal groups are protected with t-butoxycarbonyl group. Also, the present invention is concerned with methods for preparing the copolymers.

2. Description of the Prior Art

A significant advance has been made for the photoresist used in microlithography, which is one of the most essential techniques to achieve the high integration of semiconductor integrated circuits. As higher integration degree of a semiconductor integrated circuit has been required, various photoresist materials are now developed and reported. Among them, polyvinylphenol resins protected by t-butoxycarbonyl group and poly(4-t-butoxycarbonyloxystyrene) resins are expected to be the most useful and are being used in practice. These resins are very advantageous in that they are directly applied for such techniques advanced in microlithography as utilizes deep uv as a light source for exposure, as disclosed in U.S. Pat. Nos. 4,491,628, 4,405,708 and 4,670,507.

However, the polyvinylphenol resins show high optical absorbance at around 250 nm due to the benzene rings contained. Because deep uv, a light source for the microlithography in current use, has a frequency of around 250 nm, the polyvinylphenol resins are low in transparency at the frequency.

Poly(4-t-butoxycarbonyloxystyrene) resins lose too much weight upon thermal treatment after exposure in addition to being poor in adhesiveness. Like polyvinylphenol resins, they show low transparency because of high optical absorbance at around 250 nm. For example, a resin obtained by using 4-t-butoxycarbonyloxy styrene with an average molecular weight of 10,000 as a monomer and 2,2'-azobisisobutyronitrile (AIBN) as an initiator, shows a uv optical absorbance of 0.170 at 250 nm when it is 1 μm thick. For a resin 1 μm thick polymerized from the monomer in the presence of benzoylperoxide, its uv optical absorbance is 0.140. As exemplified above, both resins are opaque at around 250 nm because of high optical absorbance.

SUMMARY OF THE INVENTION

As a result of intensive and thorough research by the inventors, the present invention is based on the finding that a vinyl 4-t-butoxycarbonyloxybenzal-vinyl alcohol-vinyl acetate copolymer and a vinyl 4-t-butoxycarbonyloxybenzal-vinyl 4-hydroxybenzal-vinyl alcohol-vinyl acetate copolymer both show low absorbance at 250 nm in addition to being superior in thermal stability and mechanical strength. Also, the copolymers can be applied for photoresist. Various tests showed that the photoresist made mainly of the copolymers was transparent at 250 nm, lost little weight upon the thermal treatment after exposure and adhered well to the silicon wafer.

DETAILED DESCRIPTION OF THE INVENTION

To prepare a novel vinyl 4-t-butoxycarbonyloxybenzal-vinyl alcohol-vinyl acetate copolymer, poly(vinyl alcohol) with an average molecular weight of about 8,000–200,000 is dissolved in dimethylformamide to give a 5–20 wt % solution. This solution is then added to an acid and stirred at 50–140° C. for 1–5 hrs. 4-hydroxybenzaldehyde is added, followed by stirring under the same conditions as above. Precipitation occurs in distilled water. The precipitate is dissolved in dimethylformamide again and re-precipitated in distilled water. The procedure of dissolving in dimethylformamide and precipitating in distilled water is repeated two or three times. Then, the final precipitates are dried in vacuo to obtain pure vinyl-4-hydroxybenzal-vinyl alcohol-vinyl acetate copolymer. The acid, hydrochloric acid, sulfuric acid, or phosphoric acid is used at an amount of 1–20 weight parts based on 100 weight parts of the total reaction. Instead of dimethylformamide, distilled water may be employed. In this case, as the polymerizing reaction progresses, the copolymer is produced as precipitates. A desired product can be obtained by filtering and washing the precipitates.

The vinyl 4-hydroxybenzal-vinyl alcohol-vinyl acetate copolymer thus obtained is dissolved in dimethylformamide to give a 3–20 wt % solution which is, then, stirred for about 1 hr in the presence of sodium hydride (NaH), t-butoxide, triethylamine or calcium carbonate ($CaCO_3$). Subsequently, di(t-butyldicarbonate) is added, followed by stirring at room temperature for 0.5–2 hr. A product is obtained in distilled water as precipitates. Then, they are dissolved in dimethylformamide again and re-precipitated in distilled water. The procedure of dissolving in dimethylformamide and precipitating in distilled water is repeated two or three times. Then, the final precipitates are dried in vacuo to produce pure vinyl 4-t-butoxycarbonyloxybenzal-vinyl alcohol-vinyl acetate copolymer or vinyl 4-t-butoxycarbonyloxybenzal-vinyl 4-hydroxybenzal-vinyl alcohol-vinyl acetate copolymer. When di(t-butylcarbonate) is added at an amount more than the mole numbers of vinyl 4-hydroxybenzal group, bulky vinyl 4-hydroxybenzal groups are all protected with t-butoxycarbonyl group producing vinyl-4-butoxycarbonyloxybenzal-vinyl alcohol-vinyl acetate copolymer. In contrast, addition of di(t-butylcarbonate) at an amount less than the mole numbers of vinyl 4-hydroxybenzal group protects a portion of vinyl-hydroxybenzal groups with t-butoxycarbonyl group producing vinyl 4-t-butoxycarbonyloxybenzal-vinyl 4-hydroxybenzal-vinyl alcohol-vinyl acetate copolymer.

Depending on the ratio of the functional groups contained, the copolymers have characteristic properties. Hence, the functional groups must be present at a certain amount range in order for the copolymers to be used as photoresist. In accordance with the present invention, 4-t-butoxycarbonyloxybenzal group is preferably present at an amount of 5–70 mole % in the vinyl 4-t-butoxycarbonyloxybenzal-vinyl alcohol-vinyl acetate copolymer. For example, if 4-t-butoxycarbonyloxybenzal group is present at an amount less than 5 mole %, the vinyl 4-t-butoxycarbonyloxybenzal-vinyl alcohol-vinyl acetate copolymer cannot be used practically because deficient protection cannot effect the difference in solubility in a developing solution. On the other hand, if 4-t-butoxycarbonylbenzal group is present at an amount more than 70 moles, the copolymer is poor in adhesion to the substrate. More than 60 mole % of hydroxy group makes an unexposed area to be solubilized in a developing solution. If acetate group is present at an amount more than 40 mole %, the extrication transition temperature of the copolymer significantly decreases. Accordingly, it is preferrable that hydroxy group is present at an amount of 1–60 mole % and 4-t-butoxycarbonyloxybenzal group is present at an amount of 5–70 mole %, in the vinyl 4-t-butoxycarbonyloxybenzal-vinyl alcohol-vinyl acetate copolymer, according to the present invention. Thus, acetate group is preferably present at an amount of 0–40 mole % in the copolymer.

In accordance with an aspect of the present invention, a vinyl 4-hydroxybenzal-vinyl alcohol-vinyl acetate, represented by the following general formula I is provided:

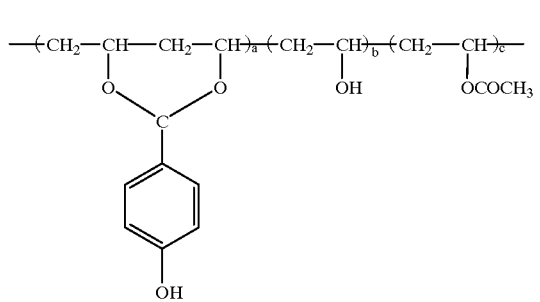

(I)

wherein
a is a mole percent ranging from 5 to 70;
b is a mole percent ranging from 1 to 60; and
c is a mole percent ranging from 0 to 40.

In accordance with another aspect of the present invention, a vinyl 4-t-butoxycarbonyloxybenzal-vinyl alcohol-vinyl acetate copolymer, represented by the following general formula II is provided:

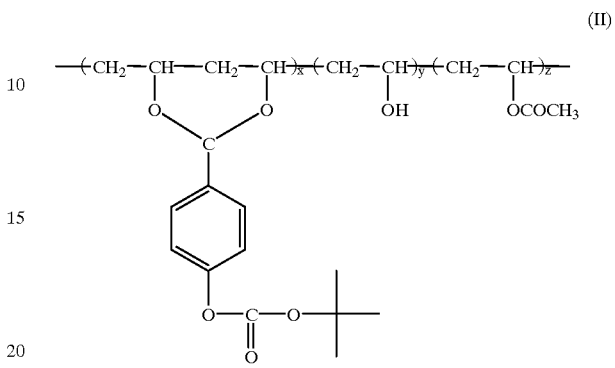

(II)

wherein
x is a mole percent ranging from 5 to 70;
y is a mole percent ranging from 1 to 60; and
z is a mole percent ranging from 0 to 40.

The copolymer chains of formulas I and II each shows regularity or irregularity.

In the vinyl 4-t-butoxycarbonyloxybenzal-vinyl 4-hydroxybenzal-vinyl alcohol-vinyl acetate copolymer according to the present invention, the vinyl 4-hydroxybenzal groups of vinyl 4-hydroxybenzal-vinyl alcohol-vinyl acetate copolymer remain partly unprotected by t-butoxycarbonyl group. Such unprotected acetal structure brings about the effects of enhancing mechanical strength, increasing extrication transition temperature, and intensifying sensitivity by virtue of the remaining phenol. Because an appropriate solubility in developing solution comes from the deprotection of the 4-t-butoxycarbonyl group, the 4-hydroxybenzal group unprotected by t-butoxycarbonyl group does not exceed 50 mole %. Therefore, in accordance with a further aspect of the present invention, a vinyl 4-t-butoxycarbonyloxybenzal-vinyl 4-hydroxybenzal-vinyl alcohol-vinyl acetate copolymer, represented by the following general formula III is provided:

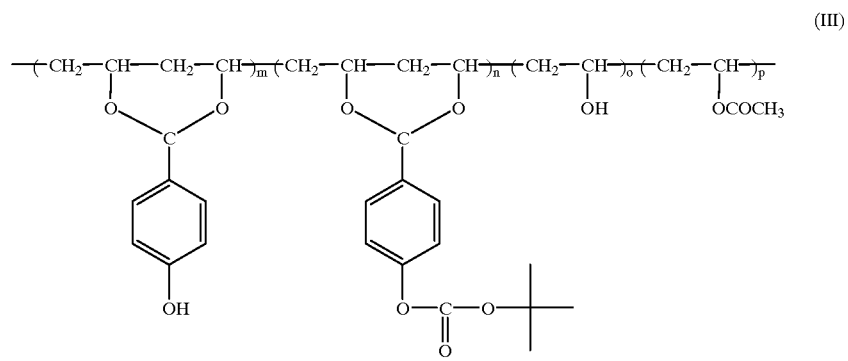

(III)

wherein
   m is a mole percent ranging from 1 to 50;
   n is a mole percent ranging from 5 to 60;
   o is a mole percent ranging from 1 to 60; and
   p is a mole percent ranging from 0 to 40.

The polymers of Formulas II and III are superior in thermal stability and mechanical strength by virtue of the presence of acetal structure in their main chains. In addition, because the t-butoxycarbonyl group, which, upon thermal treatment after exposure, is deprotected to change the solubility of the copolymer in a particular solvent, is substituted only in the acetal structure. Also, the copolymer shows little weight loss in the thermal treatment. Therefore, the photoresist film made of the copolymer does not lose its thickness when being developed. Optical absorbance at 250 nm was found to be about 0.021 for the resin 1 μm thick prepared from the copolymers with an average molecular weight of about 10,000, as determined by infrared spectra. This value is no more than $1/8$–$1/7$ of the optical absorbance of poly(4-t-butoxycarbonyloxystyrene) resin. Thus, the copolymers are far superior in transparency. In addition, the hydrophilicity effected by the alcohol and acetate groups present in the copolymer chain allows the copolymer to better adhere to silicon wafer.

A better understanding of the present invention may be obtained in light of following examples which are set forth to illustrate, but are not to be construed to limit, the present invention.

EXAMPLE I

Preparation of Copolymer II

In a 250 mL four-neck flask equipped with a calcium conduit, a funnel, a nitrogen gas conduit, a thermometer 100 mL of dimethylformamide and 5 g of poly(vinylalcohol) (saponification 80%, average molecular weight 9,00–10,000) were added and completely mixed by stirring at 50° C. for 5 hr, after which 3 mL of 36% hydrochloric acid solution was added. Then, using the funnel, 50 mL of dimethylformamide containing 3 g of 4-hydroxybenzaldehyde was dropwise added into the flask for 1 hr with stirring at room temperature. The product thus obtained was slowly added through a funnel in 800 mL of distilled water in a beaker with stirring. Precipitates produced were dried in vacuo for 24 hr. The dried precipitates were dissolved in dimethylformamide again and re-precipitated in distilled water. After the solubilization and re-precipitation procedure were repeated twice, the final precipitates were dried in vacuo to give pure copolymer I. Yield was 80%.

The synthesis of the copolymer I was confirmed by the following NMR and IR spectra. The NMR spectra showed that the mole ratio of 4-hydroxybenzal:alcohol:acetate in the copolymer was 37:49:14.

$^1$H-NMR (300 MHz, DMSO-δ6: δ9.43(S, Ph-OH), 7.18 (s, o-Ph), 6.75–6.65(d, m-Ph), 5.38(s, —O—CH—O—), 4.0–3.80(d, CH—OH), 2.86(s, —OH), 2.71(s, —OH), 1.9(s, —CH$_3$), 1.75–1.30(m, —CH$_2$—).

IR (NaCl) cm$^{-1}$: 3331, 1734, 1662, 1520, 1437–1340, 1248, 1103, 1019

Separately, a four-neck flask equipped with a calcium conduit, nitrogen gas conduit and a thermometer were added with 1.4 g of sodium hydroxide and sealed, after which 100 mL of dimethylformamide was injected through a syringe into the flask and stirred at 20° C. for 30 min. After cooling the temperature into 0° C., 100 mL of dimethylformamide solution containing 3 g of the synthesized copolymer II was slowly added in the flask for 30 min by means of a syringe with stirring. Stirring was continued for 1 hr at room temperature. After cooling the temperature into 0° C. again, 20 mL of dimethylformamide solution containing 12 g of di(t-butyldicarbonate) was slowly added in the flask for 30 min by means of a syringe with stirring. Stirring was continued at 20° C. for 5 hrs.

After terminating the reaction, a product was obtained as precipitates in distilled water. They were dissolved in dimethylformamide again and re-precipitated in distilled water. The resulting precipitates were dried in vacuo for 24 hr to give pure copolymer II. Yield was 70%.

The synthesis of the copolymer II was confirmed by the following NMR and IR spectra. The NMR spectra showed that the mole ratio of 4-t-butoxycarbonyloxybenzal:alcohol:acetate in the copolymer was 37:49:14.

$^1$H-NMR (300 MHz, DMSO-δ6: δ7.42(s, o-Ph), 7.17–7.13(d, m-Ph), 5.51(s, —O—CH—O—), 4.0–3.8(d, br, —CH—OH), 2.93(s, —OH), 2.77(s, —OH), 1.94(s, —CH$_3$), 1.71–1.67, 1.22–1.09(m, —CH$_2$), 1.47(s, —C(CH$_3$)$_3$).

IR (NaCl) cm$^{-1}$: 3389, 1757, 1738, 1372, 1148

EXAMPLE II

Preparation of Copolymer II

Copolymer I used for the preparation of the copolymer II was obtained in a similar manner as that of Example I, except that poly(vinyl alcohol) with an average molecular weight of 124,000–186,000 was dissolved in dimethylformamide at 130° C. Yield was 78%.

The synthesis of the copolymer I was confirmed by NMR and IR spectra. The NMR spectra showed that the mole ratio of 4-hydroxybenzal:alcohol:acetate in the copolymer was 42:45:13.

Using the copolymer I, copolymer II was prepared in a yield of 65% in the same manner as that of Example I, and its synthesis was confirmed by NMR and IR spectra. The NMR spectra showed that the mole ratio of 4-t-butoxycarbonyoxybenzal:alcohol:acetate in the copolymer was 42:45:13.

EXAMPLE III

Preparation of Copolymer II

Copolymer I was prepared in a similar manner as that of Example I, except that distilled water was used instead of dimethylformamide. A 4-hydroxybenzaldehyde solution was dropwise added, stirred at 60° C. for 8 hr, and the precipitated product was washed many times with distilled water and dried. Yield was 60%.

The synthesis of the copolymer I was confirmed by NMR and IR spectra. The NMR spectra showed that the mole ratio of 4-hydroxybenzal:alcohol:acetate in the copolymer was 10:75:15.

Using the copolymer I, copolymer II was prepared in a yield of 65% in the same manner as that of Example I, and its synthesis was confirmed by NMR and IR spectra. The NMR spectra showed that the mole ratio of 4-t-butoxycarbonyoxybenzal:alcohol:acetate in the copolymer was 10:75:15.

EXAMPLE IV

Preparation of Copolymer III

Copolymer I was prepared in a similar manner as that of Example I, except that poly(vinyl alcohol) with an average molecular weight of 124,000–186,000 was dissolved in dimethylformamide. Yield was 78%.

The synthesis of the copolymer I was confirmed by NMR and IR spectra. The NMR spectra showed that the mole ratio of 4-hydroxybenzal:alcohol:acetate in the copolymer was 44:45:11.

Using the copolymer I, 0.7 g of sodium hydride and 6 g di(t-butyldicarbonate), the procedure for copolymer II of Example I was repeated, to produce copolymer III. Yield was 70%. Its synthesis was confirmed by NMR and IR spectra. The NMR spectra showed that the mole ratio of 4-t-butoxycarbonyloxybenzal:4-hydroxybenzal:alcohol:acetate in the copolymer was 18:24:45:11.

As described hereinbefore, a novel vinyl 4-hydroxybenzal-vinyl alcohol-vinyl acetate copolymer, a vinyl 4-t-butoxycarbonyloxybenzal-vinyl alcohol-vinyl acetate copolymer and a vinyl 4-t-butoxycarbonyloxybenzal-vinyl 4-hydroxybenzal-vinyl alcohol-vinyl acetate, in the latter two polymers the vinyl 4-hydroxybenzal groups being all or partly protected with t-butoxycarbonyl group, and preparation methods thereof are provided in accordance with the present invention. The latter two copolymers can be applied for photoresist. This photoresist prepared from the copolymers of the present invention is superior in transparency, thermal stability, mechanical strength, and adhesion to silicon wafer. In addition, when being utilized in microlithography, the photoresist can enhance the resolution by virtue of its low weight loss upon thermal treatment after exposure.

The present invention has been described in an illustrative manner, and it is to be understood that the terminology used is intended to be in the nature of description rather than of limitation.

Many modifications and variations of the present invention are possible in light of the above teachings. Therefore, it is to be understood that within the scope of the appended claims, the invention may be practiced waysother than those specifically described.

What is claimed is:

1. A photoresist copolymer, comprising repeating units represented by the following formula III:

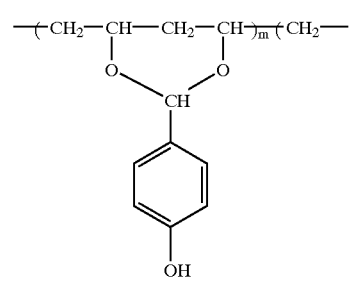

-continued

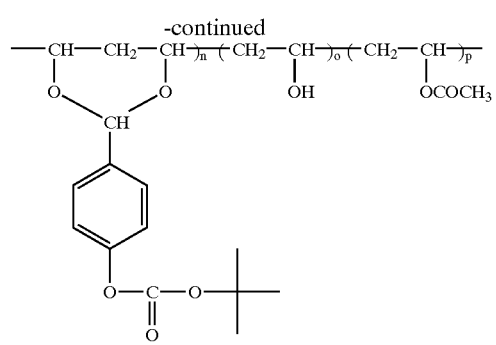

wherein:

m is a mole percent ranging from 1 to 50;

n is a mole percent ranging from 5 to 60;

o is a mole percent ranging from 1 to 60; and p is a mole percent ranging from 0 to 40.

2. A photoresist material comprising the copolymer having repeating units represented by the following formula II:

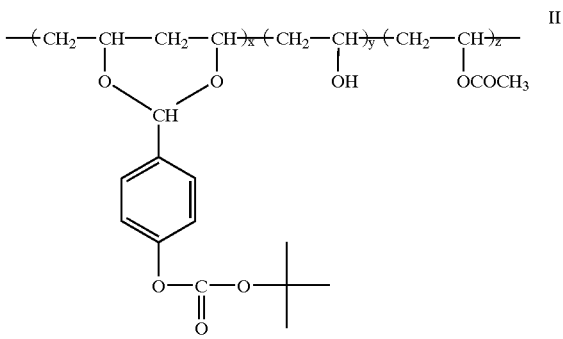

wherein x is a mole percent ranging from 5 to 70;

y is a mole percent ranging from 1 to 60; and z is a mole percent ranging from 0 to 40.

3. A photoresist copolymer comprising repeating units prepared by addition polymerization of:

(i) vinyl 4-t-butoxycarbonyloxybenzal as a first comonomer, (ii) vinyl alcohol as a second comonomer, (iii) vinyl acetate as a third comonomer, and (iv) vinyl 4-hydroxybenzal as a fourth comonomer.

4. A photoresist material comprising the copolymer of claim 1.

* * * * *